US009453361B2

(12) United States Patent
Montgermont et al.

(10) Patent No.: US 9,453,361 B2
(45) Date of Patent: Sep. 27, 2016

(54) LUMINOUS MULTIPLE GLAZING UNIT COMPRISING LIGHT-EMITTING DIODES

(75) Inventors: Aude Montgermont, Paris (FR); Jingwei Zhang, Massy (FR); David Delhorme, Vouël (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 701 days.

(21) Appl. No.: 13/576,506

(22) PCT Filed: Jan. 24, 2011

(86) PCT No.: PCT/FR2011/050128
§ 371 (c)(1),
(2), (4) Date: Oct. 31, 2012

(87) PCT Pub. No.: WO2011/092421
PCT Pub. Date: Aug. 4, 2011

(65) Prior Publication Data
US 2013/0039059 A1 Feb. 14, 2013

(30) Foreign Application Priority Data
Feb. 1, 2010 (FR) ..................... 10 50669

(51) Int. Cl.
*F21V 1/00* (2006.01)
*E06B 3/66* (2006.01)
*F21V 8/00* (2006.01)

(52) U.S. Cl.
CPC ............... *E06B 3/66* (2013.01); *G02B 6/0096* (2013.01)

(58) Field of Classification Search
CPC ................................. G02B 6/0096; E06B 3/66
See application file for complete search history.

(56) References Cited

U.S. PATENT DOCUMENTS

| 5,459,955 A | 10/1995 | Ruskouski et al. |
| 6,026,602 A * | 2/2000 | Grondal et al. ................. 40/570 |
| 7,350,951 B2 * | 4/2008 | Sakai ................... G02B 6/0096 362/225 |
| 2004/0264168 A1* | 12/2004 | Gotz et al. ....................... 362/92 |
| 2011/0267817 A1* | 11/2011 | Hoffman et al. ............. 362/235 |

FOREIGN PATENT DOCUMENTS

| DE | 103 22 561 | 12/2004 |
| JP | 02-299102 | 12/1990 |
| JP | 2002-282436 | 10/2002 |

(Continued)

OTHER PUBLICATIONS

International Search Report Issued Jul. 7, 2011 in PCT/FR11/050128 Filed Jan. 24, 2011.

(Continued)

*Primary Examiner* — Sean Gramling
(74) *Attorney, Agent, or Firm* — Oblon, McClelland, Maier & Neustadt, L.L.P

(57) ABSTRACT

A luminous multiple glazing unit including: first and second flat glass elements; light-emitting diodes located in an internal space; a reflector including a part fixed to the glazing unit in the internal space; and a first luminous zone associated with the first glass element. In a first configuration, the reflector has a central reflective area for reflecting at least 30% of total flux emitted by the diodes in the group onto a first mechanism scattering light, or, in a second configuration, the reflector forms a beam splitter and has a double-image central reflective area of a first central area for reflecting first central rays onto a first mechanism scattering light and a second central area for reflecting second central rays onto a second scattering mechanism, the reflector reflecting at least 30% of total flux emitted by the diodes in the group.

18 Claims, 5 Drawing Sheets

(56) References Cited

FOREIGN PATENT DOCUMENTS

| JP | 2005-084153 | 3/2005 |
| JP | 2009-087794 | 4/2009 |

OTHER PUBLICATIONS

English translation of Office Action issued Dec. 16, 2014 in Japanese Patent Application No. 2012-551663.

* cited by examiner

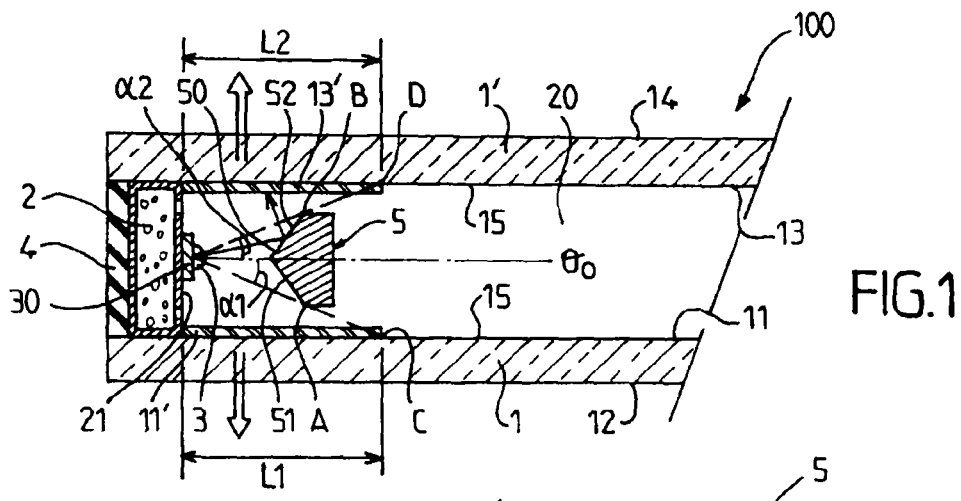
FIG.1
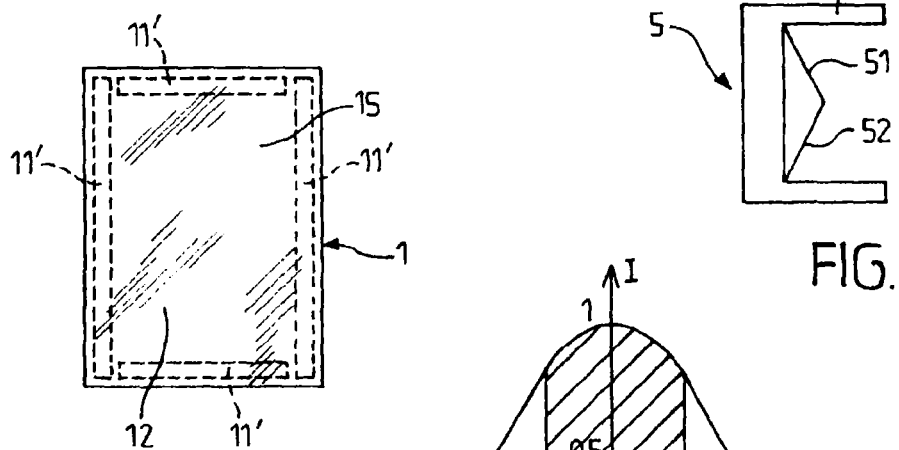
FIG.1a
FIG.1b
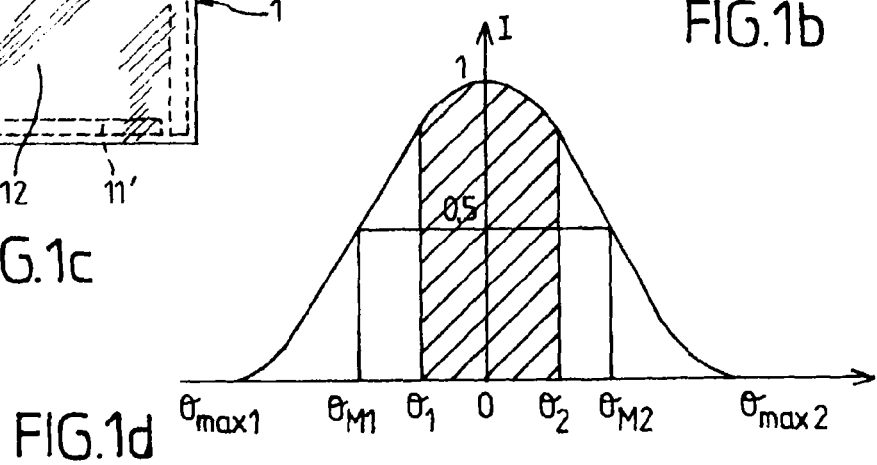
FIG.1c
FIG.1d

LUMINOUS MULTIPLE GLAZING UNIT COMPRISING LIGHT-EMITTING DIODES

BACKGROUND

The present invention relates to a luminous multiple glazing unit and more particular to a luminous multiple glazing unit comprising light-emitting diodes.

Light-emitting diodes or LEDs were originally employed as status or indicator lights in electrical and electronic appliances but have already, for a number of years, been used as light sources in signaling devices such as traffic lights, in automotive vehicle lighting (indicators, side lights) or in torches or path lighting. Light-emitting diodes are advantageous because of their long lifetime, their luminous efficiency, their robustness and their compactness, making systems using them more durable and easier to maintain.

Document DE 10 322 561 describes an insulating double glazing unit, for illuminating the façades of buildings, comprising (in the embodiment corresponding to FIG. 4 in this document DE 10 322 561):
- a first glazing pane with internal and external faces;
- a second glazing pane with main internal and external faces, placed opposite the first glazing pane;
- an internal space filled with gas;
- a peripheral seal;
- a peripheral frame made of aluminum, located between the two glazing panes, forming a spacer and making contact with the sealing means, this frame bearing two groups of diodes, respectively on two opposed edges of the glazing unit, the diodes being fixed to mountings that lie perpendicular to the main faces of the glazing panes;
- a reflector for each group of diodes, forming an extension of the frame, the reflectors being arranged to redirect light traveling toward the internal face of the second glazing pane toward the internal face of the first glazing pane; and
- the light then being reflected or deviated by the internal face or faces and/or by one or more coatings on the internal or external faces.

The Applicant has observed that this light-emitting-diode-comprising insulating glazing unit is not optimized in terms of optical performance.

BRIEF SUMMARY

The aim of the invention is to provide a, preferably simple, more efficient, luminous multiple (especially insulating) glazing unit that meets the requirements of industry (easy and quick to produce, reliable, etc.).

The invention may preferably even increase the number of possible applications.

For this purpose, the present invention firstly proposes a luminous multiple glazing unit that comprises:
- a first (substantially) flat glass element made of mineral or organic glass, with first and second main faces and an edge face;
- a second (substantially) flat glass element made of or organic glass, preferably having dimensions that are similar or identical to those of the first glass element and the same nature and shape (rectangular, square, round, etc.), with a main face, called the third face, lying opposite the first face, and another main face, called the fourth face, and an edge face;
the first and second glass elements being securely fastened to and spaced apart from each other;
- an internal space, at least between the first and third faces, this space especially being evacuated or filled with a gas, such as one or more inert gases or air;
- a spacer separating said first and second elements, the spacer especially being located at the periphery of the glazing unit and especially bounding the internal space;
- at least one group of light-emitting diodes located in the internal space, the diodes being mounted on one or more mountings (also called diode supports), the diodes especially being aligned along an axis, the diodes naturally having a given emission spectrum in the visible;
- the diodes in said group each having a given main emission direction that is substantially parallel the first face, typically making an angle of up to +5° or −5° to the first face (or the third face);
- a reflector that reflects the light emitted by said group of diodes, the reflector comprising a part fixed to the glazing unit in the internal space; and
- a first luminous zone associated with the first glass element, the light originating from said group of diodes.

Furthermore, in a first configuration, said part of the reflector has a central reflective (especially flat or concave relative to the group of diodes) area that makes an oblique angle to the first face and that is, in particular, located opposite the group of diodes, this reflective area being able to reflect, in a first position, and with an optional lateral reflective area, what are called central rays of said group of diodes, including the main emission direction or the main emission directions, and forming at least 30% of the total flux from the diodes in said group and preferably at least 50% of the total flux from the diodes, these central rays being reflected onto the first luminous zone, said first luminous zone being provided with a first means for scattering light, which means receives the central rays.

Or, in a second configuration, said part of the reflector, part forms a beam splitter (the two beams optionally being identical) having a double-image central reflective area consisting of:
- a first central area, at an oblique angle to the first face, able to reflect first central rays from said group of diodes onto the first luminous zone, said first luminous zone being provided with a first means for scattering the light, which means receives the first central rays; and
- a second central area, at an oblique angle to the third face, able to reflect second central rays from said group of diodes onto a second luminous zone associated with the second glass element, said second luminous zone being provided with a second means for scattering light, which means receives the second central rays, the first and second central areas being substantially contiguous (a chamfer possibly being provided, for example), the first and second central rays including the main emission direction or main emission directions and forming at least 30% of the total flux from said group and preferably at least 50% of the total flux from the diodes.

In the prior-art luminous insulating glazing unit, the central rays (around the main emission direction) were lost, and only certain lateral rays were reflected toward the first glass element.

By virtue of the reflector according to the invention, the central rays are reflected toward the first face and/or the third face. This reflector therefore ensures a better optical efficiency.

The central area (whether a double-image area or not) according to the invention may also be used to recycle light backscattered by the scattering means and/or reflected onto the diode mounting(s) and/or reflected (especially specular reflection) onto the spacer of the double glazing unit, for example a metal or metalized spacer when the mounting(s) is (are) associated with this spacer.

Moreover, for the prior-art luminous insulating glazing unit neither the presence nor the position of the scattering means was explicitly described.

According to the invention, the first scattering means and the optional second scattering means bound the extent of the first luminous zone and the optional second luminous zone, especially in a band. The scattering means preventing particularly intense dazzle at the specular reflection angle. Uniform illumination is furthermore provided by virtue of the scattering means.

The group of diodes is for example placed equidistant from the first and second glass elements.

The first luminous zone (respectively the second luminous zone) may cover the entire (functional, visible) area of the first glass element (respectively all of the second glass element) except for a margin, especially in the case of a small glazed area, for example a long but narrow rectangle. The glazing unit for example forms rectilinear means for illuminating signs, a railing, etc.

The first luminous zone (respectively the second luminous zone) may cover a fraction of the (functional, visible) area of the first glass element (respectively a fraction of the second glass element), for example a quite thin luminous zone (band, etc.) in the case of a large glazed area, when a first dim, i.e. nonluminous, zone (respectively a second dim zone), especially a central zone, has a given different functionality. The (maximum) width L1 (which width is either constant or variable) of the first luminous zone (having any possible shape) and/or the optional (maximum) width L2 (which width is either constant or variable) of the second luminous zone (having any possible shape) may preferably be smaller than 200 mm, even smaller than or equal to 100 mm, especially so as to leave a large dim area.

The first luminous zone may be a peripheral zone, especially lying along an edge of the glazing unit and the first dim zone, the second more central dim zone then being further from the diodes than the first dim zone.

The first luminous zone may be located in a given zone of the glazing unit, which zone is for example a central zone, the first dim zone then possibly being a more peripheral.

The first (single, multiple, uniform, nonuniform) dim zone may be chosen from:
- a (semi)transparent zone in the first glass element; and/or
- a reflective zone forming a mirror, obtained by depositing a reflective coating on the first glass element, especially on the first face, for example a silvering, the first scattering means preferably being formed by etching the mirror; and/or
- a translucent zone or zone with a satin finish (preserving privacy) for example obtained by texturing the first glass element; and/or
- a decorative zone decorated with an opaque and/or colored coating or by tinting the thickness of the first glass element.

The second glass element may comprise a dim, i.e. nonluminous, zone called the second dim zone, which preferably is located opposite the first dim zone, and especially adjacent and/or in the vicinity of the optional second luminous zone.

The second (single, multiple, uniform, nonuniform) dim zone may be chosen from:
- a (semi)transparent zone in the second glass element; and/or
- a reflective zone forming a mirror, obtained by depositing a reflective coating on the second glass element, especially on the third face, for example a silvering, the optional second scattering means preferably being formed by etching the mirror; and/or
- a translucent zone or a zone with a satin finish (preserving privacy) for example obtained by texturing the second glass element; and/or
- a decorative zone decorated with an opaque and/or colored coating or by tinting the thickness of the second glass element.

The first dim zone and the second dim zone may have the same functionality (being a mirror, transparent, translucent or decorative), especially with identical means, or different functionalities:
- one may be a mirror while the other is transparent and/or translucent and/or decorative; or
- one may be transparent while the other is translucent and/or decorative.

The glazing unit may be fixed to an opaque element (wall, floor, etc.) in the first configuration. If not, in the first or the second configuration, the fourth face may be visible.

A reflective area, providing the mirror function, may be, and usually is, obtained using a silver-based layer. The mirror may an SGG Miralite mirror from Saint-Gobain Glass, coated with a protective paint preventing oxidation, or, as a variant, it may be a chromium-based mirror, such as the SGG Mirastar product from Saint-Gobain Glass.

Naturally, according to the invention, at least some (even all) of the lateral rays (i.e. rays other than the central rays) traveling directly toward the first face (without being reflected) preferably encounter the first scattering means.

Furthermore, at least some and even all of the lateral rays (rays other than the central rays) traveling directly toward the third face (without being reflected) preferably encounter the second scattering means.

In a preferred embodiment, the reflector, optionally extends beyond the, optionally double-image, central area and the optional lateral area, and comprises:
- a first zone bounding reflection of the emitted rays, especially a first end (stop, etc.) of the reflector, making an angle $\alpha1$ to the main emission direction or directions, the first scattering means extending such that most, even at least 80% and even 100%, of what are called lateral rays, exceeding the angle $\alpha1$, and emitted toward the first face, are scattered by the first scattering means, and this in the (only) operating position or even in all the operating positions;
- and, preferably, in the case of the second configuration, a second zone bounding reflection of the emitted rays, especially a second end (stop, etc.) of the reflector, opposite the first end, making an angle $\alpha2$ to the main emission direction or directions, the second scattering means extending such that most, even at least 80% (even 100%), of what are called lateral rays, making an angle greater than $\alpha2$, and emitted toward the third face, are scattered by the second scattering means, and this in the (only) operating position or even in all the operating positions;
- or, preferably, in the case of the first configuration, the extent of the central area and the lateral reflective area being such that most, even at least 80% (even 100%), of what are called lateral rays emitted toward the third face are reflected toward the first scattering means.

If the first zone bounding reflection of the emitted rays does not touch the first face, in particular if the central area is short and not associated with a lateral area, it is thus desirable to extend the first scattering means a sufficient distance away from the source so that a maximum number of rays is used to illuminate the first luminous zone.

If the first zone bounding reflection of the emitted rays touches the first face, it is of course not necessary to extend the first scattering means beyond the contact zone (away from the source).

Furthermore, it may be preferable to extend the first scattering means to the point or level where the most lateral (divergent, i.e. defined by an angle corresponding to the maximum emission half-angle) ray encounters the first face.

The same is true for the second zone bounding reflection.

In the case of the first configuration, the lateral area may extend from the central area (especially by extension of the part and/or by adding a reflective layer to the third face) to a point where it is able to reflect the most lateral (divergent) ray, i.e. a ray defined by an angle corresponding to the maximum emission half-angle.

The multiple glazing unit may comprise a low-E function, a solar control function or any other functional coating (scratch resistant, antifouling, etc.) preferably on the second and fourth faces, etc.

The first scattering means may preferably be associated with the first face and preferably the first scattering means is formed by texturing the surface of the first glass element, especially by sand-blasting, acid etching or abrading, or by adding a scattering element, especially a layer, preferably by screen-printing an enamel or scattering layer, or else formed by a scattering plastic laminated to the first glass element.

The second scattering means may preferably be associated with the third face and preferably the second scattering means is formed by texturing the surface of the second glass element, especially by sand-blasting, acid etching or abrading, or by adding a scattering element, especially a layer, preferably by screen-printing an enamel or scattering layer, or else formed by a scattering plastic laminated to the second glass element.

Thus, if the scattering means are arranged in the thickness of the glass and/or on the internal face (first face and/or third face), they are protected and the external face (second face and/or fourth face) making contact with the external environment may be smooth and easily cleaned.

Acid etching, sand-blasting, etching (advantageously laser etching) or screen-printing will possibly be used by preference because they allow the area and shape of the treated zones to be easily controlled and reproduced industrially.

Mention may be made, by way of acid-etched glass, of Satinovo® glass from Saint-Gobain Glass, and, by way of glass comprising a scattering layer, of Smoothlite® glass from Saint-Gobain Glass.

The first (respectively the second) glass element may have a high luminous transmission in the dim zone(s) of at least 85% or even more, whereas in the zones associated with the scattering means it has a luminous transmission lower than 85% and even lower than or equal to 70% but preferably greater than 20%.

The haze in the first (respectively the second) luminous zone, measured in the conventional way using a hazemeter, may preferably be higher than 70% and even higher than or equal to 85%.

The first glass element and/or the second glass element may be made of clear or extra-clear mineral glass. Concerning extra-clear glass, the reader may refer to application WO 04/025334 for the composition of an extra-clear glass. In particular a soda-lime-silica glass may be chosen with an Fe III or $Fe_2O_3$ content of less than 0.05%. For example, Diamant® glass from Saint-Gobain Glass or (textured or smooth) Albarino® glass from Saint-Gobain Glass, or Opti-WHITE® glass from Pilkington or B270® glass from Schott may be chosen.

Furthermore, mineral glass is preferred for the first and second glass elements because it has a number of advantages:
  glass has a good heat resistance, it may be located near the diodes despite the fact that they get hot;
  glass is strong so it is easy to clean and does not scratch, which is particularly advantageous for glazing units installed in places where strict hygiene standards are enforced; and
  glass meets the requirements of fire safety standards.

The glass elements may, by way of example, especially depending on the desired appearance or optical effect and/or the destination of the multiple glazing unit, be made of:
  glass having a standard composition, such as Planilux® glass from Saint-Gobain Glass, and a slight green color;
  colorless extra-clear glass (neutral color) such as Diamant® glass from Saint-Gobain Glass;
  glass patterned with pyramids, such as Albarino® glass from Saint-Gobain Glass, pyramidal reliefs being formed in the external face of the substrate facing the external environment of the luminaire;
  tempered glass having a higher strength; or
  laminated glazing panes.

The first and/or second glass element, especially when laminated, may be associated with an additional glass element or form a triple vacuum or insulating glazing unit. The first glass element is for example a central or external element.

For each diode of the group, a set of light rays may be defined, forming the central rays, emitted in an emission cone about the main emission direction, and corresponding to at least 30% of the flux emitted by this very diode, even 50%.

To determine the total flux, called S2, emitted by the group of diodes, a goniometer, arranged so as to measure all the (primary) rays emitted, is conventionally used.

In the first configuration, to determine the total reflected flux, called S1, the goniometer is used, arranged so as to measure the (primary) rays emitted by the group of diodes and reflected by the reflector. Thus S1/S2 must be greater than or equal to 30% and even greater than or equal to 50%.

In the second configuration:
  to determine the first reflected flux, called S11, the goniometer is used, arranged so as to measure the (primary) rays emitted by the group of diodes and reflected by the reflector on the side of the first glass element; and
  to determine the second reflected flux, called S12, the goniometer is used, arranged so as to measure the (primary) rays emitted by the group of diodes and reflected by the reflector on the side of the second glass element.

Thus (S11+S12)/S2 must, depending on the circumstances, be greater than or equal to 30% and even greater than or equal to 50%.

Preferably, for greater simplicity, the diodes of said group are chosen to have the same (single) main emission direction $\theta_o$.

It is also preferable, to provide uniform illumination, for the diodes of said group to be chosen to have the same monochromatic or polychromatic spectrum.

Preferably the beam diverges, for better uniformity.

Thus, the full width at half-maximum $\theta_{M1}$ (in the direction of the first luminous zone) and/or $\theta_{M2}$ (in the direction of the second luminous zone) may be at least 50°, preferably at least 60° and even at least 70°.

The emission cone may be symmetric or asymmetric with respect to $\theta_o$.

The emission cone may for example be Lambertian.

The power of each diode in said group may be lower than 1 W, especially lower than 0.5 W and, the group of diodes being distributed over a mounting or mountings having a total length L0 expressed in meters, the total power of said group expressed in watts is less than or equal to 30 [W/m]×L [m] so as to limit heating and therefore increase the lifetime of the diodes.

To further increase the luminous efficiency, the mounting may comprise a free (flat or inclined) scattering area encircling the group of diodes, for example a lacquer or paint. A white reflector is used for example.

The mounting may be:
securely fastened (directly or indirectly fixed) to said spacer, especially in the case of peripheral illumination; the first luminous zone may then possibly extend along an edge of the first face and the optional second luminous zone may extend along an edge of the third face and preferably the main direction is then normal to the mounting;
or securely fastened (directly or indirectly fixed) to a pad in the internal space, especially in the case of more central illumination, the group of diodes possibly being fixed to the pad, and optionally an additional group of diodes being fixed to another adjacent pad opposite said pad.

The peripheral spacer may be a strip with any cross section, especially a monolithic strip, or a frame—especially if a vacuum or insulating gas(es) are to be used. The spacer is located on the periphery of the glazing unit, between the first and third faces, even on the edge faces.

The pad may form an additional spacer of any shape. It may also be less tall than the height of the internal space, and receive, via the horizontal face of the mounting, side-emitting diodes.

Furthermore, the reflector may be fixed to the spacer or to the pad or may indeed be an extension of said spacer or pad.

The mounting may be of any shape, it may for example be planar, especially having a square or rectangular transverse cross section. The diodes may be small bare or encapsulated chips. The diodes may for example be surface mounted devices (SMDs) or "chip on board" devices. Lenses are not necessary.

The mounting is often what is called a printed circuit board (PCB). It is made of a plastic or metal, especially of aluminum.

Preferably the mounting (or mountings) is (are) made of metal and the diodes are soldered to tracks that are electrically isolated from the metal.

Since the metal of the mounting conducts heat, the mountings may be pressed directly against the metal spacer (or against an additional metal pad, or else a metal region of the reflector part between the mounting and the spacer or pad) so as to dissipate heat.

The mounting may be fastened for example by clip-fastening and/or screwing.

Preferably, a thermal conductor (thermal paste, thermal tape and/or thermal adhesive, etc.) may be placed intermediate between the metal spacer (or the metal pad and/or the metal region of the reflector) and the mounting so as to further improve the dissipation of heat and thereby increase the luminous efficiency and lifetime of the diodes.

Thus, the mounting may preferably be fixed by way of thermally conductive fixing means, such as a thermally conductive adhesive or double-sided adhesive tape.

An adhesive tape has the advantage of having a calibrated thickness allowing the mounting to be perfectly flat and ensuring that the diodes are all located the same distance away from the spacer (or pad or reflector). In addition, the adhesive tape can be fixed to the mounting beforehand.

It is preferred to join the mounting and the LEDs with a double-sided adhesive tape or a curable adhesive (which does not set immediately) so as to allow relative positioning of the small mounting on the spacer or pad or reflector.

Furthermore, thermal paste may be used between the mounting and the metal spacer or metal pad or reflector.

With a plastic mounting, the diodes are soldered to thermal pads added to two opposed faces of the mounting and through its thickness. The fastening is necessarily obtained by an electrically insulating but thermally conductive fixing substance associated with the thermal pads. The thermally conductive fixing substance is for example the thermally conductive adhesive or thermally conductive double-sided adhesive tape mentioned above.

The reflector is preferably a specular reflector especially having a reflection coefficient of 70% or more, even 80% or more; however, the reflector is optionally a diffuse reflector. The part forming a region of or forming the reflector may be metalized or made of metal and especially of anodized aluminum.

The reflector may be monolithic, in said part, and especially made of metal or two materials: for example the part, especially made of metal, forming the, optionally double-image, central area may be associated with one or more, especially metal, reflective layers located on the third face or indeed on the spacer. In a simple and effective embodiment, the part forming a region of or forming the reflector may be a planar or concave (relative to the diodes) plate that is optionally folded or curved one or more times and that is 1 mm or less in thickness.

The plate has longitudinal edge faces and (shorter) lateral edge faces and may be fixed for example:
especially to the peripheral spacer, by one or more lateral edge faces; and/or
by at least one backside area opposite the frontside area oriented toward the diodes, especially the lateral area or an area located between the spacer or the second glass element.

The part forming a region of or forming the reflector may be hollow or solid, has lateral edge faces and especially has a triangular transverse cross section:
with a (backside) area that presses against or is even fastened to the first, especially under the first scattering means, and/or to the third face, especially under the optional second scattering means; or
is especially fixed to the peripheral spacer, for example by the lateral edge face or faces.

In an insulating or vacuum double glazing unit, the internal space may have a minimum height of 5 mm. It is preferable for the height of the internal space to be as large as possible, so as to allow the reflector to be freely positioned (obliquity, etc.).

In a double glazing unit with two glazing panes simply fastened together securely, the internal space has any height.

The reflector, optionally beyond the, optionally double-image, central area, may extend until it makes contact with the first face or until there is a maximum play between the first face and the reflector of less than 5 mm, even of 1 mm or less—depending on the height of the internal space.

The reflector, optionally beyond the, optionally double-image, central area, may also extend until it makes contact with the third face or until there is a maximum play between the third face and the reflector of less than 5 mm, even of 1 mm or less—depending on the height of the internal space.

The central area or the first central area makes an acute angle of 20° to 60°, especially of 30° to 50°, to the first face and the optional second central area makes an acute angle of 20° to 60°, especially of 30° to 50°, to the third face.

The vertical projection onto the first face and the vertical projection onto the third face of at least the, optionally double-image, central area and even all of the reflector are both 3 mm or less and preferably 1 mm or less when the central area is chosen to be able to move into an inactive position, the group of diodes being turned off, which position is especially substantially perpendicular to the first face.

In the first configuration, the reflector extends laterally beyond the central area toward the first face and forms another lateral reflective zone that is spaced apart from the first face with an end that is curved away from the diodes so as to spread the beam, especially formed by folding a planar strip having a rectilinear cross section (especially a metal sheet).

In the first configuration, the part forming a region of or forming the reflector may comprise:
- a first oblique flange comprising the central area and optionally the lateral reflective area,
- extended by a second flat flange, especially for fastening, located between the spacer or a pad in the internal space and the third face or even located on the spacer or a pad in the internal space, the second flange especially being made of metal and being located under the mounting to enable dissipation of heat.

In the first configuration, the reflector may be masked by an opaque coating, especially an enamel, a mirror or a, for example colored, decorative coating, placed opposite the first scattering means and even over all of the third or fourth face.

In the first configuration, the part forming a region of or forming the reflector may comprise:
- a first flange, especially a flange that is flat or concave toward the diodes, comprising the central oblique area and optionally the lateral reflective area,
- prolonged by another, especially flat or concave toward the diodes, flange spaced apart from or on the third face, especially for fastening of the reflector.

In the first configuration, the part forming a region of or forming the reflector can move and in particular pivots about an axis that is especially parallel to the first face and, in operation, in a second position, the central area reflects the central rays of the group of diodes onto the second scattering means.

The part may be laterally fixed to the glazing unit at the axis about which the reflector pivots (or at a transferred axis).

For the splitter reflector, the first central area may make an acute angle of 20° to 60°, especially of 30° to 50°, to the first face and the second central area, having a different or distinct obliquity to the first area, makes an acute angle of 20° to 60°, especially of 30° to 50°, to the third face.

The point opposite the source is centered on or shifted from the main emission direction.

Preferably, the reflector may have, so that it can be fastened, an M-shaped transverse cross section in a zone shifted from the first luminous zone (between two strips of diodes, etc.) and optionally under the scattering means lying in this "dim" zone.

The multiple glazing unit may be a double glazing unit or a vacuum glazing unit especially with a peripheral sealing system, for example of the type combining mastic and butyl rubber, preferably located between the first and third faces, or on the exterior, especially as described in patent WO 0 179 644.

The spacer then forms a frame (having a C-shaped or closed cross section, especially a square or rectangular cross section), the spacer optionally containing a desiccant.

The glass elements may be securely fastened by bonding said first and second elements between the first and third faces.

The glazing unit may comprise another group of diodes and another first luminous zone, especially along an edge that is opposite or adjacent the edge chosen for the peripheral first luminous zone.

The reflector may be a single part thus also serving for said other first zone; it for example comprises a number of groups of diodes lying along a number of and even all the edges (except for the corners).

The reflector (at least the central area) is for example an integral part, especially a frame.

The one or more groups of diodes can be coupled to control means controlling whether light is permanently or intermittently emitted, the brightness of the emitted light and whether a given color or various colors are emitted, especially depending on the amount of natural light.

The glazing unit may be used to produce decorative illumination, architectural illumination or illumination for signs or displays.

The glazing unit may be intended to be used:
- as an architectural glazing unit such as a luminous panel, a luminous window, a ceiling light, a luminous floor or wall tile, a luminous glazed door, a luminous partition, a stairway step;
- in a mode of transportation as a luminous side window or a luminous sunroof or a luminous window or a luminous glazed door especially in public transport, trains, subway cars, tramway trams, buses or waterborne or airborne vehicles (airplanes);
- to lighting roads or urban spaces;
- as a glazing unit for urban furniture such as a luminous glazed part of a bus shelter, a balustrade, a counter, a store window, a shelving element, a greenhouse;
- as a glazing unit for interior design, such as a luminous wall in a bathroom, a luminous mirror, as a luminous glazed part of a piece of furniture; and
- as a glass element, especially of a door, glass shelving, a cover or of domestic or professional refrigerators.

The durability of light-emitting diodes is particularly advantageous in intensive-use applications such as in public transport such as trains, airplanes, coaches, cruise ships, etc.

BRIEF DESCRIPTION OF THE DRAWINGS

Other details and advantageous features of the invention will become apparent on studying examples of luminous multiple glazing units according to the invention, illustrated by the following figures:

FIGS. 1, 2, 3, 3*a*, 4, 5, 6 and 8 show schematic cross-sectional views of the luminous multiple glazing unit in various embodiments of the invention;

FIGS. 1*a* and 1*b* show schematic front and side views of the reflector of the first embodiment shown in FIG. 1 and FIG. 1*d* shows the radiation pattern of a diode in the first embodiment shown in FIG. 1;

FIGS. 1*c* and 8*a* show schematic top views of the luminous multiple glazing units in FIGS. 1 and 8.

DETAILED DESCRIPTION

Figure 2:
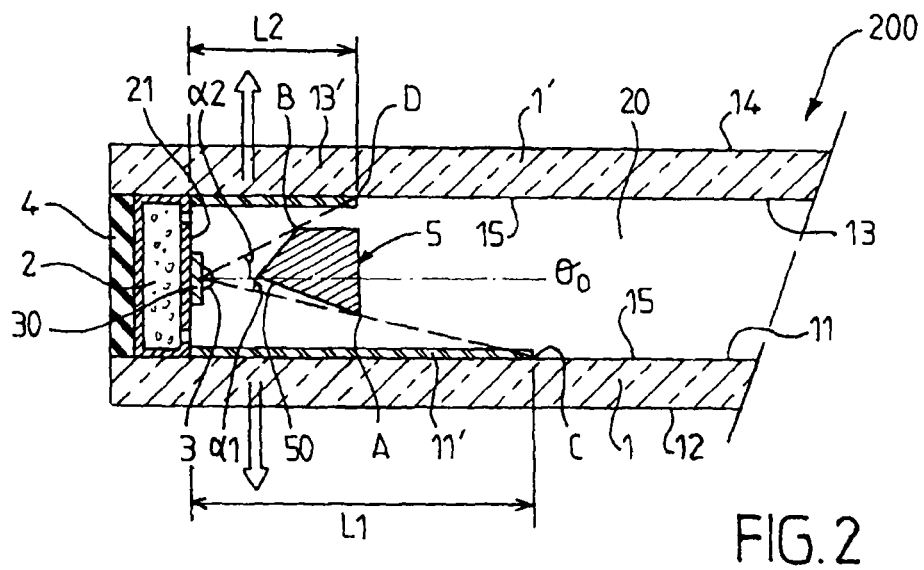

It will be noted that, for the sake of clarity, the various elements of the objects (and the angles) shown are not necessarily to scale. Furthermore, in the figures, the light rays shown do not necessarily rigorously obey the laws of optics.

FIG. 1 shows a schematic view of a partial longitudinal cross section through a multiple glazing unit 100 comprising light-emitting diodes in a first embodiment of the invention.

The glazing unit 100, here an insulating glazing unit, comprises:
  a first flat glass element 1 made of mineral glass, with first and second main faces 11, 12, for example a square (or rectangular, etc.) glass sheet;
  a second flat glass element 1', with the main face, called the third face 13, lying opposite the first face, and another main face 14, called the fourth face, for example a square (or rectangular, etc.) glass sheet;
  the first and second elements being securely fastened to and spaced apart from each other;
  an internal space, between the first and third faces, this space especially being evacuated or filled with a gas, such as one or more inert gases or air;
  a spacer 2 separating the first and second glass elements at the periphery of the glazing unit, bounding the internal gas-filled space, the spacer taking the form of a frame 2 having a rectangular transverse cross section and having a free face that is perforated so as to bring a desiccant into contact with the air or gas in the space, and optionally as a variant microspacers or studs are added and a vacuum glazing is formed; and,
  in the internal space, four groups of diodes 3 on four mountings 30 (in other words there are four strips of diodes), each mounting being associated with a free face of said spacer, the four groups of diodes being divided into:
  a first group of light-emitting diodes lying along a first edge;
  a second group of light-emitting diodes lying along a second edge;
  a third group of light-emitting diodes lying along a third edge; and
  a fourth group of light-emitting diodes lying along a fourth edge,
each of the diodes in each group having a given main emission direction substantially parallel the first face, for example equidistant from the first and third faces 11, 13.

Furthermore, by virtue of the four groups of diodes:
  four first luminous zones are associated with the first glass element 1, each first zone being provided with a first scattering means 11' preferably located on the first face 11, these first zones for example taking the form of four luminous peripheral bands lying along four edges (as shown in FIG. 1*c*), the width(s) L1 of these first zones being identical or different and especially being smaller than 200 mm and even smaller than 100 mm, the first luminous zones lying adjacent a first dim central zone 15; and
  four second luminous zones are associated with the second glass element 1', each second zone being provided with a second scattering means 13' preferably located on the third face, these second zones for example taking the form of four peripheral bands lying along four edges, the width(s) L2 of the second zones being identical or different and L2 being identical or different to L1 and especially smaller than 200 mm and even smaller than 100 mm, the second luminous zones lying opposite the first luminous zone and adjacent a second dim central zone 15 opposite the first dim zone.

Naturally, a number of diode strips may be used for each luminous band, especially depending on the length of the band.

Naturally, the luminous bands may be identical or have different shapes, widths, colors, natures (different scattering means), etc.

It is also possible to remove one or more of the second luminous bands if desired.

A metal part, made of anodized aluminum, fixed to the glazing unit in the internal space, is a reflector forming a beam splitter that splits the beam originating from the first group of diodes and contributes to improving the luminous efficiency and the uniformity of the first and second luminous zones.

To do this, the metal part 5 has a double-image central reflective area 50, 51, 52 consisting of:
  a first central area 51 that makes an oblique first angle of 30° to 50° to the first face 11, this first central area being able to reflect first central rays, emitted by the first group of diodes, onto the first scattering means 11' of the first luminous zone; and
  a second central area 52 that makes an oblique second angle, identical to the first angle, of 30° to 50° to the third face 13, this second central area being able to reflect second central rays, emitted by said group of diodes, onto the second scattering means 13';
  the two areas 51, 52 being contiguous (here forming a point).

The first and second central rays include rays emitted along the main emission direction (or the main emission directions if appropriate) and form at least 30% and even 50% or more of the total flux emitted by the diodes in said first group.

The main emission direction may be reflected by the point as has been shown here, or as a variant by the first central area 51 or by the second central area 52. The main emission direction may be normal the mounting 30.

The mountings 30 are preferably made of metal, especially of aluminum, and optionally comprise a scattering area encircling the groups of diodes in order to recycle rays.

The mountings 30 are for example fixed (adhesively bonded, screwed, etc.) to the internal face 21 of the spacer, here a frame, for example substantially perpendicular to the first face.

Thermal paste may preferably be used between the mounting and the spacer, such as the compound CK4960® sold by Jetart.

For each diode a set of luminous rays, called central rays, may be defined, emitted in an emission cone about the main emission direction, which emission cone is characterized by a first half-angle $\theta_1$ relative to the main direction $\theta_o$ and by a second half-angle $\theta_2$ relative to the main direction $\theta_0$.

As shown in FIG. 1d, the full width at half-maximum $\theta_{M1}$ (in the direction of the first luminous zone) and/or $\theta_{M2}$ (in the direction of the second luminous zone) may be at least 50°, preferably at least 60° and even at least 70°. The emission cone is here a Lambertian cone.

The set of what are called central rays is included in an emission cone corresponding to at least 30% of the total flux emitted by each of the diodes.

The (normal) luminance of the first and second luminous bands 11', 13' may be identical, for example when the emitted beam is symmetrical and separated into two identical beams and if the scattering means have identical optical properties (likewise for the glass panes).

As shown in FIGS. 1a and 1b, the reflector is for example fixed in place (by adhesive bonding, etc.) via two first planar lateral parts 5' to the third face and/or to the first face 11 outside the first luminous zone. These parts may be masked by extending the first and second scattering means, or for example by one or more decorative layers.

In the zone of the first luminous band 11', the reflector 5 has an M-shaped transverse cross section. The reflector is preferably made of aluminum and especially anodized aluminum and even of a piece of metalized plastic.

The first and/or second scattering means 11', 13' consist/consists of a scattering layer, for example a screen-printed layer with for example a luminous transmission of at least 40% (value measured on the first element 1).

The reflector 5, 50 is bounded by:
a first lateral reflective stop A, especially making an angle $\alpha 1$ to the one or more main emission directions, the first scattering means 11' extending such that all of what are called lateral rays, exceeding the angle $\alpha 1$, and emitted toward the first face 11, are scattered by the first scattering means 11'; and
bounded by a second lateral reflective stop B, especially making an angle $\alpha 2$ to the one or more main emission directions, the second scattering means 13' extending such that all of what are called lateral rays, exceeding the angle $\alpha 2$, and emitted toward the third face, are scattered by the second scattering means 13'.

In particular, the extreme ray touching the first face at the point C furthest from the first group of diodes will be recovered. It is also possible for the other extreme ray touching the third face at the point D furthest from the first group of diodes to be recovered.

The (central) dim zones 15 of the first and second glass elements are chosen to be transparent.

By way of example:
the area of the glazing units is 600×600 mm$^2$ with two extra-clear glass panes 2.9 mm in thickness being joined to form a double glazing unit;
the diodes have an individual power of (about) 0.4 W, giving, for a length L0 of 450 mm, a power of 20.5 W/m;
each mounting 30 is made of aluminum and bears twenty three diodes of 450 mm×10 mm×1.9 mm in size;
the height of the internal space (of the spacer 2) is 22 mm; and
the width L1 and L2 of the luminous bands is 50 mm.

A similar reflector may be used for each of the other groups of diodes or a reflectors having different designs (shape, nature, etc.) or functions (for example only providing illumination via the first glass element) may be used.

It will furthermore be noted that the reflector (or at least the double-image central area 50) lies between the scattering means 11' and 13', which may mask it from an observer facing the glazing unit.

Thus the glazing unit may be used:
as an architectural glazing unit such as a luminous panel, a luminous window, a ceiling light, a luminous floor or wall tile, a luminous glazed door, a luminous partition, a stairway step;
in a mode of transportation as a luminous side window or a luminous sunroof or a luminous window or a luminous glazed door especially in public transport, trains, subway cars, tramway trams, buses or waterborne or airborne vehicles (airplanes);
to lighting roads or urban spaces;
in a piece of urban furniture as a luminous glazed part of a bus shelter, a balustrade, a counter, a store window, a shelving element, a greenhouse;
in an interior design application as a luminous wall in a bathroom or as a luminous glass part of a piece of furniture; and
as a glass element, especially of a door, glass shelving, a cover or of domestic or professional refrigerators.

The first glass element 1 is for example oriented toward the interior after installation. As a variant, the dim (central) zones 15 are (independently) chosen to be translucent, or be reflective or be decorated (with opaque and/or colored decorations, etc.).

FIG. 2 shows a schematic view of a partial longitudinal cross section through a luminous multiple glazing unit 200 comprising light-emitting diodes in a second embodiment of the invention.

The glazing unit 200 differs from the glazing unit 100 in that the obliquity of the second central area is larger causing the width L2 to be smaller than L1.

Figure 3:
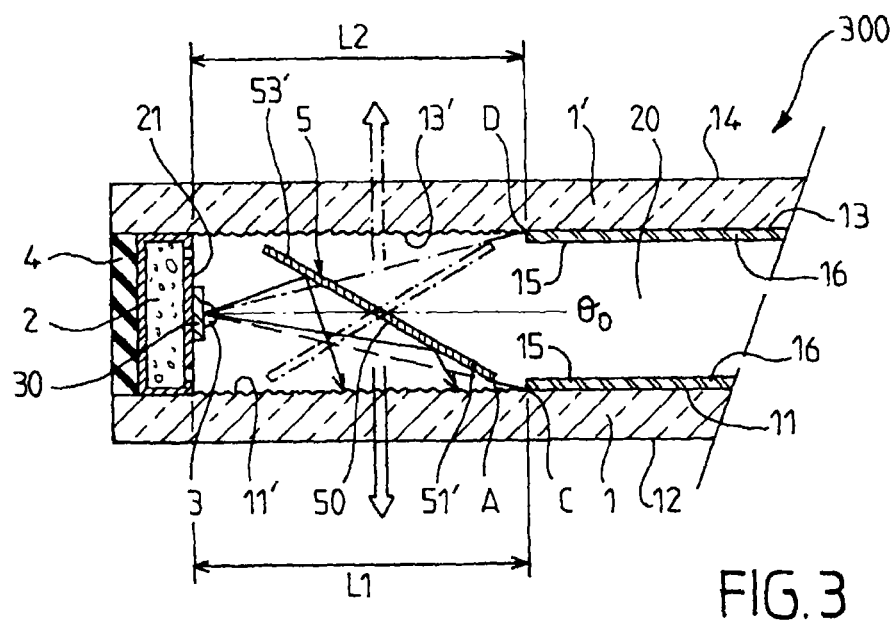

FIG. 3 shows a schematic view of a partial longitudinal cross section through a luminous multiple glazing unit 300 comprising light-emitting diodes (LEDs) in a third embodiment of the invention.

The glazing unit 300 differs from the glazing unit 100 in that the reflector used 5, 50 here can move, meaning that:
in a first position, all of the first luminous zone 11' (and optionally a fraction of the second luminous zone 12') is illuminated; and
in a second position, all of the second luminous zone 13' (and optionally a fraction of the first luminous zone) is illuminated.

In the first position (solid lines) a first reflective area, called the central are 50, of the reflector makes an oblique angle to the first face, this central area being able to reflect, with one or more lateral reflective areas 53' and 51' if required, what are called central rays emitted by said first group of diodes, the central rays including rays emitted along the main emission direction or main emission directions and forming at least 30% of the total flux emitted by the diodes of said group, these rays being reflected onto the first means 11' for scattering light.

The reflector is for example a simple metal sheet, for example made of anodized aluminum and for example 0.8 mm in thickness.

In order to form a first lateral reflective area 51' as close as possible to the first face, the part forming the reflector may extend until it makes contact with the first face 11 or until the maximum play between the first face and the reflector is less than 5 mm.

To form a second lateral reflective area 53' as close as possible to the third face, the part forming the reflector may extend until it makes contact with the third face 13 or until the maximum play between the third face and the reflector is less than 5 mm.

In a second position (dash-dot lines), the part forming the reflector can move, especially so as to pivot about an axis that especially lies parallel the first face, and in operation the central area 50 then reflects the central rays emitted by the group of diodes onto the second scattering means 13'.

The obliquity of the central area 50 is for example chosen to be 45° relative to the first face of the glass.

Thus, for example, an illuminating double mirror is formed.

The first and second scattering means are for example obtained by roughening (sand-blasting, etc.) the mirror, for example a silvering 16 on the first and third faces 11, 13 in the two dim zones 15.

Figure 3A:
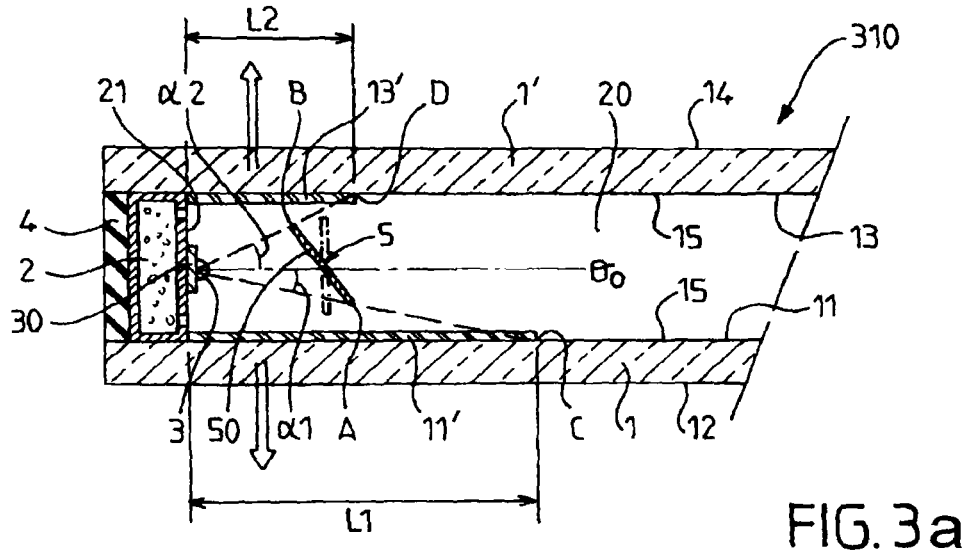

FIG. 3a shows a schematic view of a partial longitudinal cross section through a luminous glazing unit 310 comprising light-emitting diodes (LEDs), with a moveable reflector in a variant of the third embodiment of the invention.

The glazing unit 310 differs from the glazing unit 100 in that the reflector 5, 50 used does not necessarily flip to a second operating position.

Furthermore, provision is made for the reflector to be placed in an inactive position when the diodes are turned off, this inactive position especially being substantially perpendicular to the first face 11. To do this, the reflector 5 must be sufficiently short. In particular, in the rest position, the reflector must not degrade the first scattering means 11' or the first face 11. For this reason, a play of more than 1 mm, and even more than 5 mm, for example, may be left. In the inactive position, the vertical projection onto the first face 11 and the vertical projection onto the third face 13 of the reflector 5 assembly is equal to the thickness of the sheet, for example 3 mm or 1 mm or less.

Thus more natural light is allowed to pass.

The central dim zones 15 are furthermore chosen to be transparent or translucent.

Figure 4:
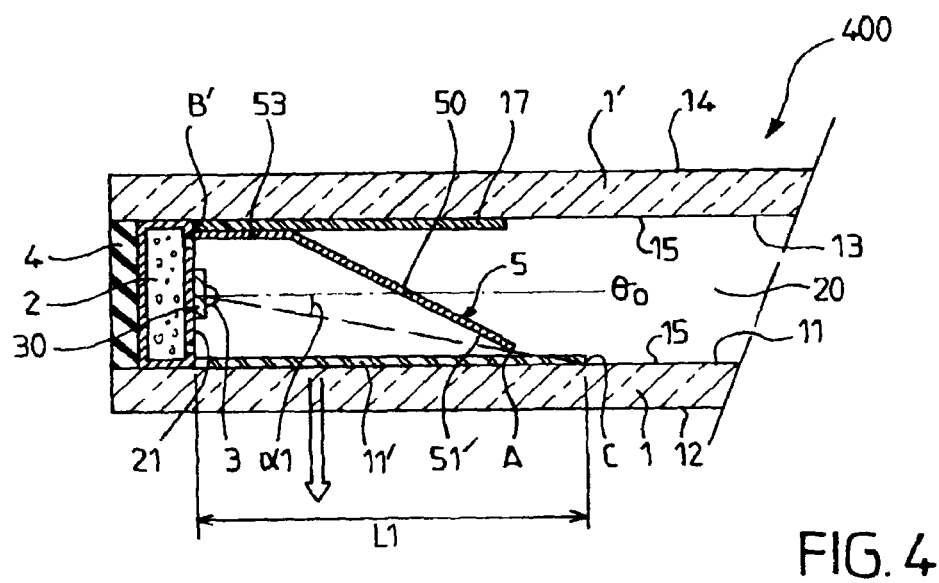

FIG. 4 shows a schematic view of a partial longitudinal cross section through a luminous insulating glazing unit 400 comprising light-emitting diodes (LEDs), in a fourth embodiment of the invention.

The glazing unit 400 differs from the glazing unit 310 in that the reflector used 5, 50 uses the first group of diodes to illuminate just one side of the unit.

The reflector comprises a metal part 5, made of anodized aluminum, with:
  a first, especially flat, flange, comprising the oblique central area 50 and a lateral reflective zone 51', reflecting light toward the first face 11; and
  a second, for example flat or concave, flange with a lateral reflective area 53, located on the third face 13, especially for fastening the reflector (by adhesive bonding, etc.), or as a variant spaced apart from the third face and fixed to the spacer.

It is for example a folded sheet.

The extent of the central area 50 and the extent of the lateral reflective area 53 are such that all the central and lateral rays (emitted toward the third face) are reflected toward the first scattering means 11'.

The second scattering means 17 (rendered inoperative by the area 53) may be kept or replaced by an optional mirror or a decorative coating if it is desired to mask the reflector 5, and especially the lateral area 53, on this side.

Figure 5:
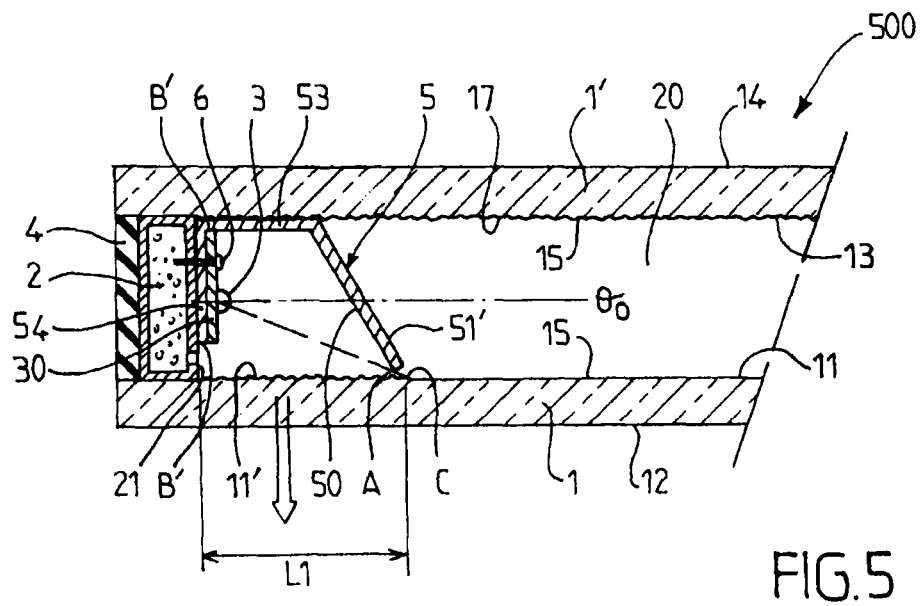

FIG. 5 shows a schematic view of a partial longitudinal cross section through a luminous insulating glazing unit 500 comprising light-emitting diodes (LEDs) in a fifth embodiment of the invention.

The glazing unit 500 differs from the preceding glazing unit 400 in that the reflector used 5, 50, for example a sheet with two folds, comprises:
  to fasten it, a region 54 associated with the spacer 2 by any means (here fastened with screws); and,
  to better dissipate heat, the region 54 is made of metal and placed under the mounting; and,
  preferably, to reflect rays, the metal region 54 encircles the mounting 30.

In this configuration, the metal reflector and the, preferably also metal, spacer act to dissipate heat. To increase the thermal conductivity, a thermal conductor (such as a thermal tape, adhesive or paste) may be placed intermediate between each of these three elements (spacer, reflector and mounting).

The second scattering means 17 (rendered inoperative) extends over the entire third surface 13 and therefore into the dim zone 15, for example making the glass 1' translucent, so as to preserve privacy (bathroom window, office partition, etc.).

Figure 6:
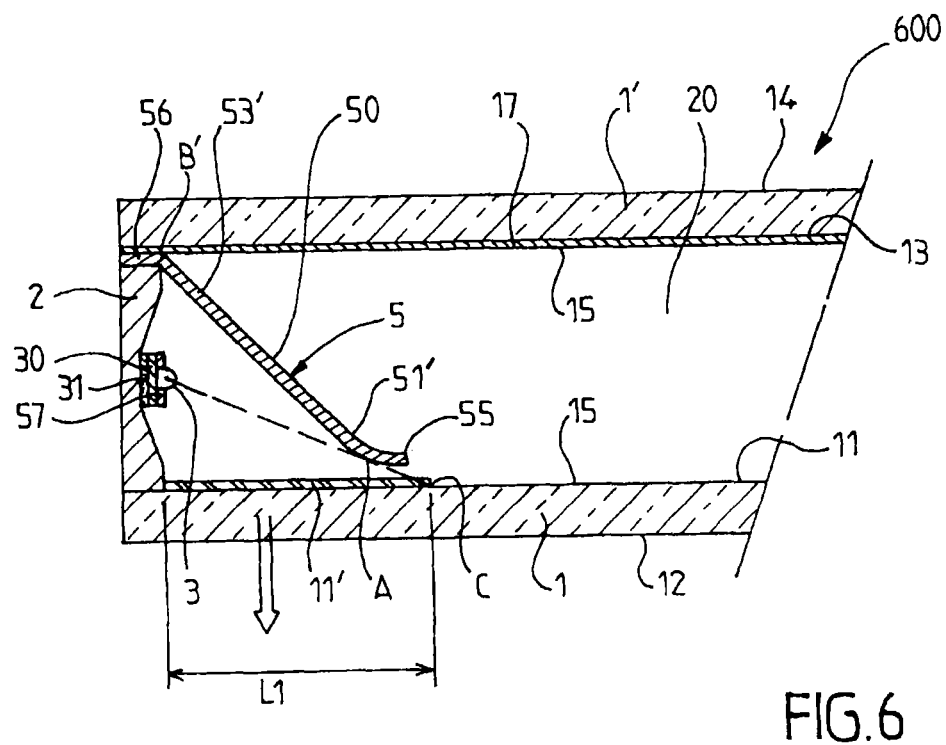

FIG. 6 shows a schematic view of a partial longitudinal cross section through a luminous multiple glazing unit 600 comprising light-emitting diodes in a sixth embodiment of the invention.

The glazing unit 600 differs from the glazing unit 400 in that the reflector used 5, 50 comprises
  to fasten it, an area 56 located between the spacer 2 and the third face 13; and
  the first lateral reflective area 51 is extended by a curved part 55 for a gradual transition between the first luminous zone 11' and the dim zone 15 of the first glass element; and
  the second lateral reflective area 53' is here an oblique extension of the central area 50.

It may for example be a sheet with two folds.

Furthermore, what is called a white reflector 57 is employed on the mounting and the metal spacer 2, the metal spacer being a part that is solid (no desiccant) and concave toward the central area, a thermally conductive double-sided adhesive 31 fastening the mounting 30 to the spacer 2.

Finally, all that is required is to simply join the glass panes 1, 1', no seal being required (i.e. typically no mastic and no butyl rubber are used). The glazing unit formed is not an insulating or vacuum glazing unit.

FIGS. 7a to 7h show transverse cross-sectional views of integral reflectors in various embodiments of the invention for illumination of one side, comprising:
  a flat or concave central area 50;
  a first lateral area 51', optionally with a curved area 55;
  a second flat or concave lateral area 53, located opposite the third face and even making contact with said face; and
  an area 54 for fastening or dissipating heat.

Figure 7A:
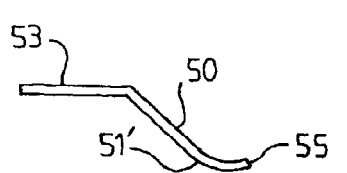
FIGS. 7*a* to 7*h* shows transverse cross-sectional views of reflectors in various embodiments of the invention.
Figure 7B:
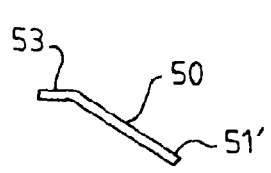
Figure 7C:
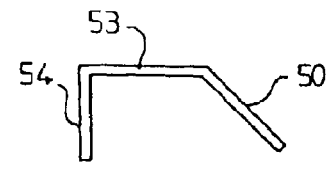
Figure 7D:
Figure 7E:
Figure 7F:
Figure 7G:
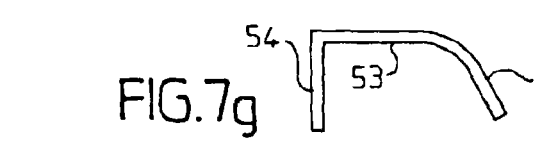
Figure 7H:
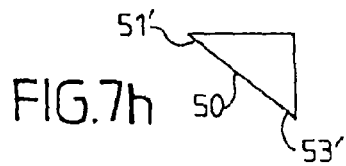

FIG. 7h in particular shows a part 5 with a triangular transverse cross section.

Figure 8:
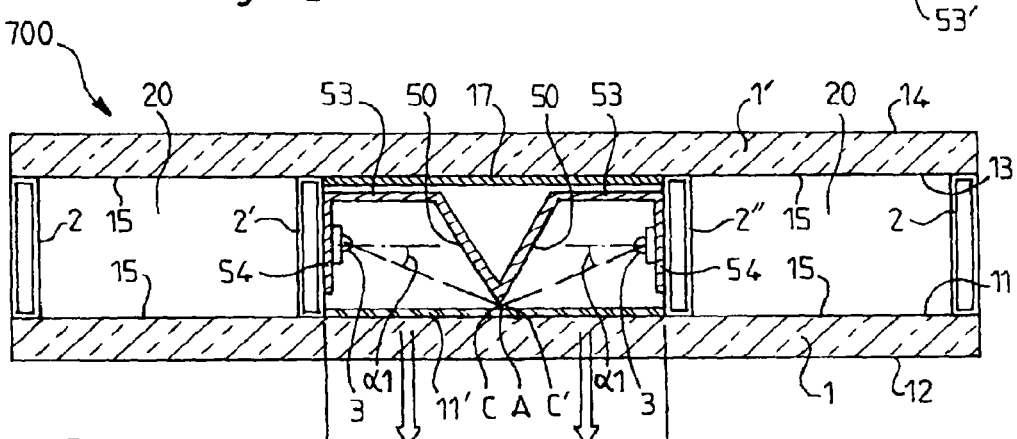

FIG. 8 shows a schematic view of a partial longitudinal cross section through a luminous insulating glazing unit 700 comprising light-emitting diodes in a seventh embodiment of the invention.

Figure 8A:
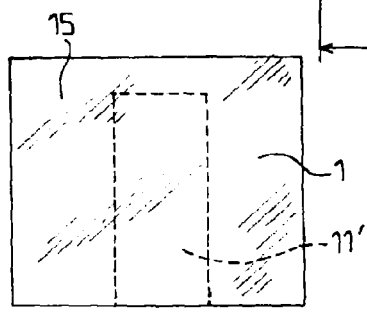

The glazing unit 700 differs from the glazing unit 500 in that:
  it has no peripheral seal;
  the location of the diodes 3 is different, for example they are located in two mutually facing groups of diodes associated with two additional pads 2' and 2";

the reflector is an integral double-image reflector comprising two regions 54, two regions 53, two regions 51' and two regions 50; and the first luminous zone 11' here has a central location and the zone 17 opposite on the third face 13, located between two peripheral dim zones 15, preferably opens onto an edge face so as to mask the electrical supply lines, as shown in FIG. 8a.

The invention claimed is:

1. A luminous multiple glazing unit comprising:
a first flat glass element made of mineral or organic glass, with first and second main faces;
a second flat glass element made of mineral or organic glass, with a main face, as a third face, lying opposite the first face, and another main face as a fourth face, the first and second glass elements being securely fastened to and spaced apart from each other;
an internal space, at least between the first and third faces, the internal space being evacuated or filled with a gas;
a spacer separating the first and second glass elements, at a periphery of the glazing unit;
at least one group of light-emitting diodes located in the internal space, the diodes being mounted on one or more mountings, the diodes in the group each having a given main emission direction that is substantially parallel to the first face;
a reflector that reflects the light emitted by the group of diodes, the reflector comprising a part fixed to the glazing unit by a first planar lateral part fixed to the first face and a second planar lateral part fixed to the third face; and
a first luminous zone associated with the first glass element;
wherein the part of the reflector forms a beam splitter having a double-image central reflective area of:
a first central area, at an oblique angle to the first face, able to reflect first central rays from the group of diodes onto the first luminous zone, the first luminous zone including a first means for scattering the light, which means receives the first central rays; and
a second central area, at an oblique angle to the third face, able to reflect second central rays from the group of diodes onto a second luminous zone associated with the second glass element, the second luminous zone including a second means for scattering light, which means receives the second central rays,
the first and second central areas being substantially contiguous, the first and second central rays including the main emission direction and forming at least 30% of the total flux from the diodes in the group, and
wherein the first planar lateral part is masked by the first means for scattering the light and the second planar lateral part is masked by the second means for scattering the light.

2. The luminous multiple glazing unit as claimed in claim 1, wherein at least one of the first glass element and the second. glass element includes at least one dim zone, and the dim zone is chosen from a reflective zone forming a mirror, a transparent zone, a translucent zone obtained by texturing the first glass element, or a decorative zone.

3. The luminous multiple glazing unit as claimed in claim 1, wherein the reflector comprises:
a first zone bounding reflection of the emitted rays making an angle $\alpha 1$ to the main emission direction, the first scattering means extending such that at least 80% of the lateral rays exceeding the angle $\alpha 1$, and emitted toward the first face, are scattered by the first scattering means; and
a second zone bounding reflection of the emitted rays making an angle $\alpha 2$ to the main emission direction, the second scattering means extending such that at least 80% of the lateral rays making an angle greater than $\alpha 2$ and emitted toward the third face are scattered by the second scattering means.

4. The luminous multiple glazing unit as claimed in claim 1, wherein the first scattering means is associated with the first face and the second scattering means is associated with the third face, and the second scattering means is formed by texturing the surface of the second glass element.

5. The luminous multiple glazing unit as claimed in claim 1, wherein, for the group of diodes, a full width at half-maximum is at least 50°.

6. The luminous multiple glazing unit as claimed in claim 1, wherein the mounting is securely fastened to the peripheral spacer, the first luminous zone extending along an edge of the first face and the second luminous zone extending along an edge of the third face.

7. The luminous multiple glazing unit as claimed in claim 1, wherein the mounting is made of metal and fixed to the spacer that is made of metal.

8. The luminous multiple glazing unit as claimed in claim 1, wherein the first central area makes an acute angle of 20° to 60° to the first face, and the second central area makes an acute angle of 20° to 60° to the third face.

9. The luminous multiple glazing unit as claimed in claim 1, wherein the first central area makes an acute angle of 20° to 60° to the first face and the second central area, having a different or distinct obliquity to the first central area, makes an acute angle of 20° to 60° to the third face.

10. The luminous multiple glazing unit as claimed in claim 1, wherein the spacer forms a frame that contains a desiccant.

11. The luminous multiple glazing unit as claimed in claim 1, wherein the glazing unit produces decorative illumination, architectural illumination, or illumination for signs or displays.

12. The luminous multiple glazing unit as claimed in claim 1, wherein the reflector includes an M-shaped transverse cross section in a zone shifted from the first luminous zone.

13. A luminous multiple glazing unit, comprising:
a first flat glass element made of mineral or organic glass, with first and second main faces;
a second flat glass element made of mineral or organic glass, with a lain face, as a third face, lying opposite the first face, and another main face as a fourth face, the first and second glass elements being securely fastened to and spaced apart from each other;
an internal space, at least between the first and third faces, the internal space being evacuated or filled with a gas;
a spacer separating the first and second glass elements, at a periphery of the glazing unit;
at least one group of light-emitting diodes located in the internal space, the diodes being mounted on one or more mountings, the diodes in the group each having a given main emission direction that is substantially parallel to the first face;
a reflector that reflects the light emitted by the group of diodes, the reflector comprising a part fixed to the glazing unit in the internal space; and
a first luminous zone associated with the first glass element;

wherein the part of the reflector has a central reflective area that makes an oblique angle to the first face, this reflective area being able to reflect, in a first position, central rays of the group of diodes, including the main emission direction, and forming at least 30% of total flux emitted by the diodes in the group, the central rays being reflected onto the first luminous zone, the first luminous zone including a first means for scattering light that receives the central rays, wherein the reflector is configured to move from the first position to an inactive position when the group of diodes are turned off, the inactive position being substantially perpendicular to the first face, and wherein a vertical projection onto the first face and a vertical projection onto the third face of at least the central area are both 3 mm or less when the central area is able to move into the inactive position.

14. The luminous multiple glazing unit as claimed in claim 13, wherein the reflector extends until there is a maximum play between the first face and the reflector of less than 5 mm.

15. A luminous multiple glazing unit, comprising:
a first flat glass element lade of mineral or organic glass, with first and second main faces;
a second flat glass element made of mineral or organic glass, with a main face, as a third face, lying opposite the first face, and another main face as a fourth face, the first and second glass elements being securely fastened to and spaced apart from each other;
an internal space, at least between the first and third faces, the internal space being evacuated or filled with a gas;
a spacer separating the first and second glass elements, at a periphery of the glazing unit;
at least one group of light-emitting diodes located in the internal space, the diodes being mounted on one or more mountings fixed to an internal face of the spacer or to an internal face of a pad, the diodes in the group each having a given main emission direction that is substantially parallel to the first face;
a reflector that reflects the light emitted by the group of diodes, the reflector comprising a part fixed to the glazing unit in the internal space; and
a first luminous zone associated with the first glass element;
wherein the part of the reflector has a central reflective area that makes an oblique angle to the first face, this reflective area being able to reflect, in a first position, central rays of the group of diodes, including the main emission direction, and forming at least 30% of total flux emitted by the diodes in the group, the central rays being reflected onto the first luminous zone, the first luminous zone including a first means for scattering light that receives the central rays, and
wherein the part of the reflector comprises:
a first oblique flange comprising the central area, and
a second flat flange extending from the first oblique flange, to fasten the reflector to the glazing unit by contacting the spacer or the pad at a position located behind the diodes in a direction opposite to the main emission direction,
the second flange being made of metal.

16. The luminous multiple glazing unit as claimed in claim 15, wherein the second flange is in contact with the mounting to enable dissipation of heat.

17. A luminous multiple glazing unit, comprising:
a first fiat glass element made of mineral or organic glass, with first and second main faces;
a second flat glass element made of mineral or organic glass, with a main face, as a third face, lying opposite the first face, and another main face as a fourth face, the first and second glass elements being securely fastened to and spaced apart from each other;
an internal space, at least between the first and third faces, the internal space being evacuated or filled with a gas;
a spacer separating the first and second glass elements, at a periphery of the glazing unit;
at least one group of light-emitting diodes located in the internal space, the diodes being mounted on one or more mountings, the diodes in the group each having a given main emission direction that is substantially parallel to the first face;
a reflector that reflects the light emitted by the group of diodes, the reflector comprising a part fixed to the glazing unit in the internal space;
a first luminous zone associated with the first glass element; and
a second luminous zone associated with the second. glass element, the second luminous zone including a second means for scattering light;
wherein the part of the reflector has a central reflective area that makes an oblique angle to the first face, this reflective area being able to reflect, in a first position, central rays of the group of diodes, including the main emission direction, and forming at least 30% of total flux emitted by the diodes in the group, the central rays being reflected onto the first luminous zone, the first luminous zone including a first means for scattering light that receives the central rays, and
wherein the part of the reflector includes a pivot axis about which the reflector moves or pivots with respect to the group of diodes, the pivot axis being parallel to the first face and, in a second position, the central area reflects the central rays of the group of diodes onto the second means for scattering light.

18. A luminous multiple glazing unit comprising:
a first flat glass element made of mineral or organic glass, with first and second main faces;
a second flat glass element made of mineral or organic glass, with a main face, as a third face, lying opposite the first face, and another main face as a fourth face, the first and second glass elements being securely fastened to and spaced apart from each other;
an internal space, at least between the first and third faces, the internal space being evacuated or filled with a gas;
a spacer separating the first and second glass elements, at a periphery of the glazing unit;
at least one group of light-emitting diodes located in the internal space, the diodes being mounted on one or more mountings, the diodes in the group each having a given main emission direction that is substantially parallel to the first face;
a reflector that reflects the light emitted by the group of diodes, the reflector comprising a planar lateral part fixed to the third face; and
a first luminous zone associated with the first glass element;
wherein the part of the reflector forms a beam splitter having a double-image central reflective area of:
a central area, at an oblique angle to the first face, able to reflect central rays from the group of diodes, including the main emission direction, and forming at least 30% of the total flux from the diodes in the group, the central rays being reflected onto the first luminous zone, the first luminous one including a first means for scattering the light that receives the central rays, and wherein the planar lateral part is masked by the first means for scattering the light.

* * * * *